June 6, 1961 J. A. CULBERTSON ET AL 2,987,143
REDUCED THERMALLY SURFACE STRESSED BRAKE
Filed Oct. 16, 1958

INVENTORS
JAMES A. CULBERTSON
BY CHARLES E. FUCHS

*L. L. Miller*
ATTORNEY

United States Patent Office 2,987,143
Patented June 6, 1961

2,987,143
REDUCED THERMALLY SURFACE STRESSED BRAKE
James A. Culbertson, Barberton, and Charles E. Fuchs, North Canton, Ohio, assignors to The Goodyear Tire & Rubber Company, Akron, Ohio, a corporation of Ohio
Filed Oct. 16, 1958, Ser. No. 767,584
1 Claim. (Cl. 188—72)

The present invention relates to vehicle brakes, and especially to aircraft brakes where improved means are provided for avoiding and reducing thermal surface stresses in the brake components.

Heretofore there have been many different types of brake designs provided and some of these brake designs have used a plurality of brake discs and rotor discs therein. Braking pressures are applied to such discs by a brake plate pressure plate and a brake back-up plate is provided in the brake assembly to serve as a stop for movement of the discs and pressure plate. In aircraft brakes, obviously very high thermal forces are set up in the brake when braking actions are effected, and thus severe thermal stresses are created in the active brake components such as the metal brake discs, pressure plates, and back-up plates used in the brake assembly. Such thermal stresses have caused various actions in the brake, one of which is to produce axial movement of brake discs and brake means associated therewith and the efficiency of the brake has been reduced.

The general object of the present invention is to avoid and overcome the creation of excessive thermal stresses in brake components, including brake discs, back-up plates, pressure plates and the like, and wherein the brake components are characterized by the provision of radially extending slots in certain of the brake members and/or by the provision of concentric circular grooves in the operative faces of certain of the brake members.

Another object of the invention is to provide a novel and improved brake design having integral components therein to aid in the dissipation of heat and thermal stresses in the brake pressure plate and other operative members of the brake.

Another object of the invention is to provide recesses or slots in brake members to provide areas for expansion of operative components of a brake means whereby the build up of excessive thermal stresses in the brake members is avoided.

Other objects of the invention are to reduce brake disc distortion; to reduce brake torque variations; and to provide a more stable brake coefficient of friction.

The foregoing and other objects and advantages of the invention will be made more apparent as the specification proceeds.

For a better understanding of the invention, reference should be had to the accompanying drawings, wherein.

When referring to corresponding parts shown in the drawing and referred to in the specification, corresponding numerals are used to facilitate comparison therebetween.

Figure 1:
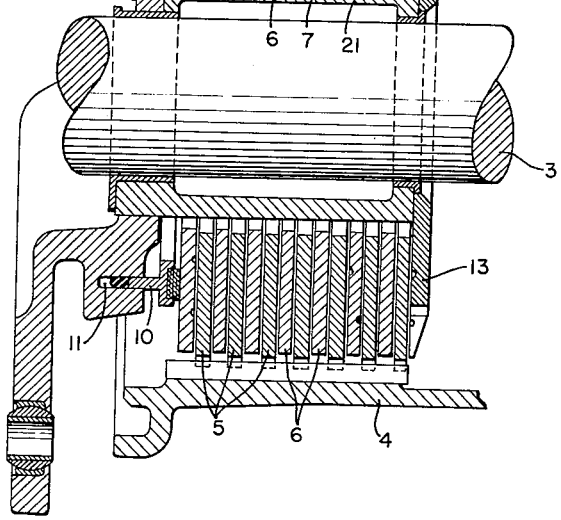
FIG. 1 is a vertical section through a brake having members embodying the principles of the invention included therein.

The present invention, generally speaking, relates to a brake including substantially conventional members, such as a frame means, an axle journalled on the frame means, a wheel carried by the axle, a plurality of rotor discs carried by and rotatable with the wheel, and a plurality of brake discs interleaved between the rotor discs and carried by the frame means, and where the brake has associated therewith a pressure plate and a back-up plate operatively secured to the frame means and sandwiching the rotor and brake discs therebetween, which brake member has means associated therewith for applying compressive pressure to the pressure plate and back-up plate and rotor and brake discs secured therebetween, said plates also having circumferentially spaced, radially extending slots extending thereinto from the radially inner and outer edges thereof to a point substantially midway of the radial length of the plates, and which plates also have a series of or one annular groove in the operative faces thereof so that such grooves and slots combine to permit thermal expansion of the material in the plates with a minimum of thermal movement or distortion of the plates.

Attention now is particularly directed to the details of the structure shown in the accompanying drawings, and a brake is indicated as a whole by the numeral 1. This brake 1 includes a brake housing, or frame support means 2 and any suitable axle 3 supports the brake frame 2 so that a wheel 4 can be rotatably secured to and carried by the axle 3. The brake means includes a plurality of rotor discs 5 that are suitably splined or engaged with slots provided in the wheel 4 by means of teeth formed on the periphery of the rotor discs 5 so that these rotor discs 5 are carried by and rotate with the wheel 4. Interleaved between the rotor discs 5 are a plurality of stator brake discs 6. One or both of these sets of brake discs 5 or 6 carry suitable braking means thereon, and any conventional type of braking means surfaces, or lining can be sintered onto, or otherwise secured to operative faces of the discs 5 and 6 so that when compressive forces are exerted on the interleaved brake discs 5 and 6, a braking action can be effected.

The stator discs 6 are suitably splined or secured to and carried by the brake frame 2, as by means of a plurality of bolts 7 that extend through slots in the stator brake discs 6 to non-rotatably secure them to the frame 2 but to permit limited movement of the brake discs axially of the bolts 7.

A brake pressure plate 8 is also provided in the brake 1 and it has a member, such as an annular piston 9, operatively engaged therewith. The piston 9 includes an annular ring or flange 10, which flange extends into a brake pressure chamber 11. Suitable hydraulic fluid is forced under pressure into the chamber 11 through a means, such as a conduit 12. Thus as brake fluid under pressure is supplied to the conduit 12, as by a hydraulic piston and cylinder apparatus of conventional construction to which the conduit 12 connects, it flows into the cylinder 11 and moves the piston 9 axially towards a brake back-up plate or member 13 that is positioned at the opposite axial end of the brake 1 from the brake piston 9. Such back-up plate 13 has the bolts 7 engaged therewith and is thus held against rotation for application of braking forces to at least one face thereof.

Figure 3:
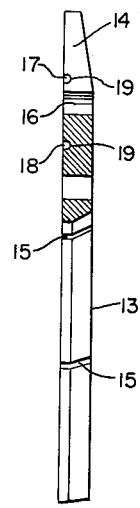
FIG. 3 is a fragmentary vertical section taken on line 3—3 of FIG. 2.
Figure 2:
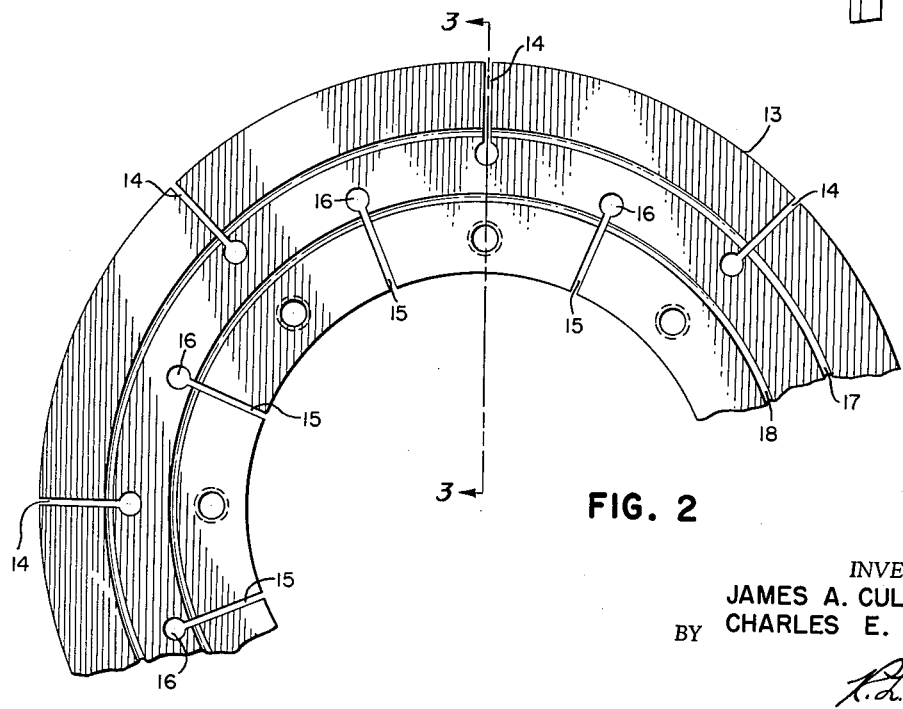
FIG. 2 is an elevation of a fragment of a back-up plate used in the brake of FIG. 1.

It is an important feature of the invention that various plates and discs in the brake 1 can have means formed therein to aid in the dissipation of thermal stresses set up in the brake components during brake action. Thus FIG. 3 of the drawings clearly shows how the brake back-up plate 13 has a plurality of substantially radially extending slots 14 and 15 extending into and through the back-up plate 13 from radially outer and radially inner surfaces, respectively, of such plate. These slots 14 and 15 extend to a point adjacent but short of the radial center line of the plate 13 and terminate in enlarged holes or sections 16 to avoid the creation of any excessive stress points or weakened areas in the back-up plate 13. The provision of such slots 14 and 15, plus the provision of one or more concentric, substantially evenly radially spaced annular grooves 17, or 18, as shown in FIG. 3, in the face of the plate 13 provides areas, or zones in the brake back-up plate, or discs for the release of thermal stresses in such members. Thus, thermal expansion of various portions of the material forming the back-up plate 13 can be had without creating any thermal movement of the plate. Such thermal movement of the back-up plate 13, for example, has caused inefficient operation of prior styles of brakes.

The grooves 17 and 18, it will be seen, have a curved inner surface indicated at 19, so that no sharp corners or weakened stress zones are set up in the brake back-up plate. In other words, sharp corners are avoided in forming the base portions of the grooves 17 so that normal stresses applied to or in the brake back-up plate 13 or other grooved member can be readily carried and will not cause any cracking, or other fracture, of the material forming the back-up plate.

It should be understood that other components of the brake 1, such as any or all of the rotor discs 5 or the stator disc 6, can have a groove or grooves, such as grooves 20 and 21 shown in FIG. 1, formed therein in the operative faces of one of the stator discs 6 to aid in dissipation of thermal stresses in the brake members whereby the brake 1 can have very high braking forces set up thereon when used but with such high braking forces not creating any undesirable thermal stresses or movement of the brake components. The grooves and slots used will vary dimensionally and configuratively according to the application to best combat thermal surface stresses in a particular brake. By practice of the principles of the invention, braking action is improved and the objects of the invention are achieved.

While a certain representative embodiment and details have been shown for the purpose of illustrating the invention, it will be apparent to those skilled in this art that various changes and modifications may be made therein without departing from the spirit or scope of the invention.

What is claimed is:

The combination in a multi-disc brake for airplanes and the like of an axle, a wheel rotatably supported on the axle, a pressure plate fixedly mounted on the axle, a pressure unit fixedly mounted on the axle in spaced relation to the plate, a plurality of stator discs operatively connected at their inner peripheries to the axle and positioned between the pressure plate and the pressure unit, a plurality of rotor discs interleaved between the stator discs and splined at their outer peripheries to the inside of the wheel, means carried by the pressure unit for compressing the interleaved discs against the pressure plate, said pressure plate having circumferentially spaced slots extending thereinto over the full axial thickness of the plate from both the radially inner and radially outer edges of the plate, said pressure plate also having an operating face engaging with the endmost of the interleaved discs, said operating face having at least a pair of concentric annular rounded bottom grooves formed thereon, one of said grooves intersecting only the radially inward directed slots in the pressure plate, and another of said grooves intersecting only the radially outward directed slots in the pressure plate.

References Cited in the file of this patent

UNITED STATES PATENTS

| | | |
|---|---|---|
| 2,304,368 | Milan | Dec. 8, 1942 |
| 2,368,621 | Tack | Feb. 6, 1945 |
| 2,368,985 | Heater | Feb. 6, 1945 |
| 2,516,966 | Du Bois | Aug. 1, 1950 |
| 2,850,118 | Byers | Sept. 2, 1958 |
| 2,856,049 | Schjolin | Oct. 14, 1958 |